United States Patent [19]
Kim et al.

[11] Patent Number: 5,976,719
[45] Date of Patent: Nov. 2, 1999

[54] MEDIATOR-LESS BIOFUEL CELL

[75] Inventors: Byung Hong Kim; Doo Hyun Park; Pyung Kyun Shin; In Seop Chang; Hyung Joo Kim, all of Seoul, Rep. of Korea

[73] Assignee: Korea Institute of Science and Technology, Seoul, Rep. of Korea

[21] Appl. No.: 08/919,320

[22] Filed: Aug. 28, 1997

[30] Foreign Application Priority Data

Aug. 29, 1996 [KR] Rep. of Korea ................ 96-36468

[51] Int. Cl.⁶ ............................................. H01M 8/16
[52] U.S. Cl. .................... 429/2; 429/12; 429/17; 429/19
[58] Field of Search .................... 429/2, 12, 17, 429/19

[56] References Cited

U.S. PATENT DOCUMENTS

| 3,340,094 | 9/1967 | Helmuth | 429/2 |
| 4,085,254 | 4/1978 | Atkins | 429/2 |
| 4,652,501 | 3/1987 | Bennetto et al. | 429/2 |

OTHER PUBLICATIONS

H. P. Bennetto, et al., "The Sucrose Fuel Cell: Efficient Biomass Conversion Using a Microbial Catalyst", Biotechnology Letters, vol. 7, No. 10, 1985, pp. 699–704 No month available.

W. Habermann, et al., "Biological Fuel Cells with Sulphide Storage Capacity", Applied Microbiology Biotechnology, 1991, pp. 128–133 No month available.

R. M. Allen, et al., "Microbial Fuel–Cells", Applied Biochemistry and Biotechnology, vol. 39/40, 1993, pp. 27–40 No month available.

S. D. Roller, et al., "Electron–transfer Coupling in Microbial Fuel Cells: 1. Comparison of Redox–mediator Reduction Rates and Respiratory Rates of Bacteria", J. Chem. Tech. Biotechnol., 1984, pp. 3–12 No month available.

*Primary Examiner*—Bruce F. Bell
*Attorney, Agent, or Firm*—Oblon, Spivak McClelland, Maier & Neustadt, P.C.

[57] ABSTRACT

The present invention provides a biofuel cell which can react with an electrode without mediator. The microorganism of a biofuel cell according to the present invention can directly consume the electrons generated from a fermentative metabolism of the microorganism through an electron metabolism without energy conservation. Therefore, if waste water is utilized as a fuel (substrate) in the biofuel cell according to the present invention, the amount of sludge production will be reduced and the efficiency of catabolizing organic materials will be increased.

5 Claims, 10 Drawing Sheets

MEDIATOR-LESS BIOFUEL CELL

TECHNICAL FIELD

The present invention relates to a mediator-less biofuel cell. More specifically, the present invention relates to a biofuel cell which can directly convert reducing equivalents generated from oxidization of a substrate by an organism into electric energy using a microorganism which can consume reducing equivalents generated during a metabolic process through its cell surface.

BACKGROUND ART

A biofuel cell is an apparatus which can convert reducing equivalents generated from the energy metabolism of an organism into electric energy using the organism or a part of the organism. For generation of electricity using a microbial fuel cell, electrons generated from the energy metabolism of a microorganism should be transferred to an electrode. However, cells of all kinds of microorganisms are surrounded by a membrane, and such a membrane is made of nonconducting lipids. Thus, direct electron exchanges between a microorganism and an electrode cannot accomplished. Therefore, when a microorganism is used as a catalyst, a suitable mediator should be used to facilitate electron transfer between an organism and an electrode.

Roller et al. disclose a biofuel cell which utilizes as a catalyst *Proteus vulgaris, Escherichia coli, Atcaligenes eutrophus, Azotobacter chroococum, Bacillus subtilis, Pseudomonas aeruginosa, Pseudomonas putida*, etc. and as an electron transfer mediator thionine, methylene blue, brilliant cresyl blue, benzyl viologen, etc. [See, Roller et al., 1984, Journal of Chemical Technology and Biotechnology 34B:3–12]. Roller et al. confirmed that the efficiency of the biofuel cell compared to the amounts of the consumed oxygen varies depending on the bacteria used and the kind of the electron transfer mediator. Also, in a fuel cell in which glucose was used as a fuel, it appeared that the best bacteria in terms of the amount of oxygen consumption and the reduction rates of an electron transfer mediator were *Escherichia coli* and *Proteus vulgaris* [See, ibid].

In a biofuel cell using an electron transfer mediator, the rates of substrate consumption, the reduction rates of mediator by a microbe and the reactivity of an electron transfer mediator with electrodes, etc. are believed to be important factors for the efficiency of a biofuel cell. In addition, the metabolism of a microbe is influenced by the redox potential of an electron transfer mediator, thus the microbe's durability as a catalyst is also very important.

Robin et al. have constituted a biofuel cell with 45 mg of *Proteus. vulgaris* as a biocatalyst, 0.5 mM of hydroxynaphatoquinone (HNQ) as an electron transfer mediator, and 20 $\mu$M of glucose as a fuel, which revealed an electromotive power of 0.5 milliamperes (mA) and 0.7 volts (V) [See, Robin et al., 1993, Applied Biochemistry and Biotechnology 39/40:27–40].

Bennetto et al. disclose a fuel cell constituted by sugar as a fuel, *Proteus vulgaris* as a catalyst and thionine as a mediator [See, Bennetto et al., 1985, Biotechnology Letters, 7:699–704]. This cell is reported to generate up to 44 coulombs (C) of electric current.

Meanwhile, Habermann and Pommer have reported that 150 mA per $cm^2$ of electric current was generated from a fuel cell comprising as an electrode cobalt oxide, molybdenum/vanadium alloy in place of an electron transfer mediator, and as a fuel hydrogen sulfide which a sulfate reducing bacterium produces in waste water [See, Habermann and Pommer, 1991, Applied Microbiology and Biotechnology 33:128–133].

Biofuel cells developed hitherto essentially use an artificial electron transfer mediator or a mediator equivalent such as sulfate. Such an artificial mediator can promote the efficiency of a fuel cell. However, the artificial mediator has disadvantages that they should be used in a limited amount since it is toxic to the microorganisms, and exerts adverse effects on microbial populations. In addition, the artificial mediator may cause environmental problems when disposing of it after consumption. Even in a case where such an artificial mediator is not used, there has been a problem that a specific metal which is not eroded by hydrogen sulfide should be used as an electrode when constructing a fuel cell since the reductive metabolic products (i. e., hydrogen sulfide) produced by a microorganism should be used as an electron transfer medium.

SUMMARY OF THE INVENTION

The inventors have conducted extensive research for many years in order to solve the problems mentioned above. As a result, the inventors have discovered unexpectedly that it is possible to prepare a biofuel cell by employing bacteria which can induce an efficient electrode reaction without a mediator.

It is therefore an object of the present invention to provide a biofuel cell that does not require an electron transfer mediator.

It is another object of the invention to provide an environmentally-friendly biofuel cell which organic or inorganic matter contained in waste water can effectively be used as a fuel.

Further objects and advantages of the invention will become apparent through reading the remainder of the specification.

BRIEF DESCRIPTION OF THE DRAWINGS

For a thorough understanding of the nature and objects of the invention, reference should be made to the following detailed description taken in connection with the accompanying drawings in which.

DETAILED DESCRIPTION OF THE INVENTION

Figure 1:
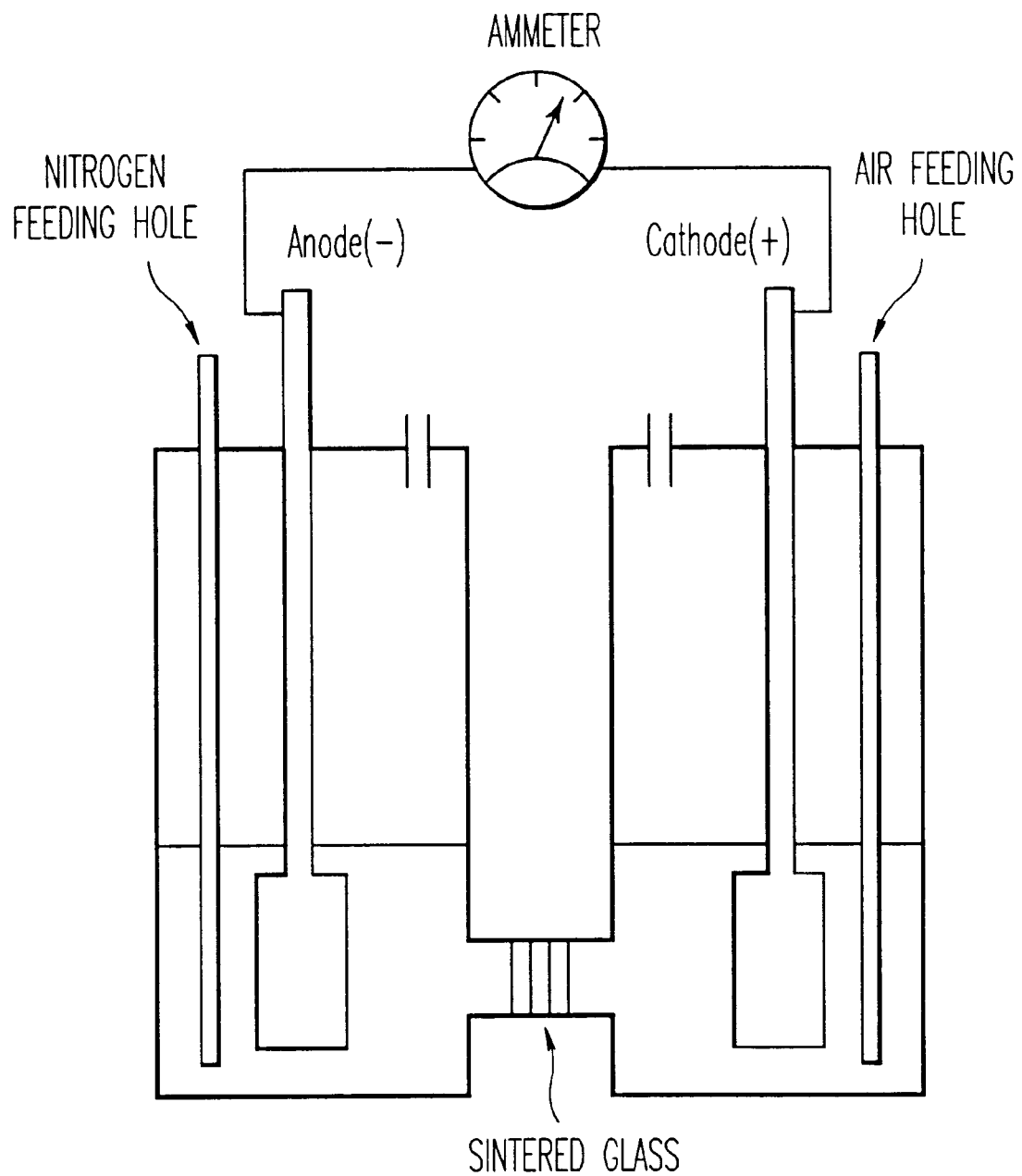
FIG. 1 is a schematic diagram of a fuel cell wherein graphite rods are used as electrodes and the cathode compartment and the anode compartment are separated by a particulate sintered glass ("glass sinter").

According to the present invention, a biofuel cell is provided which characterized in that a microorganism which can directly react with an electrode without a mediator upon determination by a cyclic voltammetric method is used as a microbial catalyst.

The more pertinent and important features of the present invention have been outlined above to facilitate a better understanding of the detailed description of the invention which follows and so that the present contribution to the art can be fully appreciated. The features of the invention described herein form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

Anaerobic bacteria which can grow in conditions of extremely low concentrations or in the absence of dissolved oxygen are classified as fermentative and respiratory bacteria depending on the bacterial energy metabolism. Fermentative bacteria catabolize polymer materials such as sugar or proteins into organic acids or alcohols, and respiratory bacteria completely catabolize the fermentation products by means of a reduction reaction of a suitable electron acceptor. Generally, in a case when various kinds of microorganisms exist in a mixed state in one system, a microorganism possessing a metabolic system which can produce more energy will prevail. An example of an electron acceptor which anaerobic respiratory bacteria can use when oxidizing organic matter includes ferric oxide (iron (III) oxide), nitrate, manganese dioxide, sulfate, carbonate, etc. It was reported that for a given electron donor, the largest energy is generated by reducing equivalents from oxidation reactions when ferric oxide is oxidized, and the energy level gradually decreases for nitrate, sulfate, and carbonate, in order [See, ByungHong Kim, Microorganism Physiology, Academic Press, Co. Ltd., Seoul, Korea (1995)]. The reduction potential in a reduction reaction of ferric oxide to ferrous oxide is known to be 0.78 V, which is similar to that of oxygen to water, 0.82 V. In addition to the ferric ion, anaerobic bacteria may utilize as an electron acceptor manganese of 4 valence, uranium of 6 valence and molybdenum of 6 valence, etc. and this kind of bacteria is commonly called as "metal salt reducing bacteria". Thus, in the description throughout the present specification, the term "metal salt reducing bacteria" refers to the bacteria utilizing as an electron acceptor a metallic ion, preferably the ferric ion, manganese of 4 valence, uranium of 6 valence or molybdenum with 6 valence, etc.

Metal salt reducing bacteria produce the reducing power and energy (ATP) required to their metabolism by oxidizing substrates through a fermentation process. A metal salt reducing bacterium oxidizes lactic acid to acetic acid, and then oxidizes acetic acid to carbon dioxide, utilizing the reducing power produced in these processes in the metal salt reduction reaction. Ferric ion along with the other electron acceptors which metal salt reducing bacteria use have extremely low solubility in water. Metal salt reducing bacteria include, but are not to limited to, *Shewanella putrefaciens* [See, Myer and Myer, 1992, Journal of Bacteriology 174:3429–3438], etc. This bacterium is known to be incapable of transporting an electron transfer acceptor into the cell but instead have cytochrome in their outer cell membrane. The bacterium transports electrons generated from the oxidation of organic matter within their cells to the outside of cells to reduce ferric ions. It is believed that since the cytochrome existing in the outer membrane of the iron-reducing bacteria is arranged so that electrons supplied from the inside of cell can be transferred to electron acceptor outside of the cells, a reaction at the electrode may be easily effected.

Such metal salt reducing bacteria consume electrons generated from a substrate using insoluble materials such as ferric ions as an electron acceptor. The energy available from the electron metabolism was not conserved (See, Table 1). Therefore, the reducing equivalent generated from the energy metabolism is not used in the bacterial reproduction, but used in the reduction of the ferric ion. Accordingly, in order to produce an adequate amount of energy for growth, the bacteria should catabolize a greater amount of organic matter than other kinds of anaerobic respiratory bacteria. Therefore, it has become apparent from the present invention that if an electrode is used as an electron acceptor in place of the ferric ion, the reducing equivalent generated from the energy metabolism of a microorganism would not be used in the reproduction of bacteria, but consumed through the electrode, and that if metal salt reducing bacteria are used in a biofuel cell utilizing waste water as a fuel (substrate), the amounts of sludge and methane production will be reduced and the efficiency of catabolizing organic matter will be greatly increased. According to the experimental results of the inventors, when reducing equivalent produced from the fermentation by the metal salt reducing bacteria is used in respiration, a suitable electron acceptor is reduced and utilized in energy production. In this process, it was proved that when an electron acceptor such as nitrate or oxygen, which can easily permeate cell membrane, is used in the respiratory metabolism, a larger amount of energy is produced. However, as can be seen from the Table 1 below, when insoluble ferric ion is utilized as an electron acceptor, there was no difference between the growth of the test bacteria on lactate or pyruvate and that by the fermentation. This means that when ferric ion is used as an electron acceptor, the energy from the electron metabolism is not conserved. Larger amounts of organic matter should be oxidized in order to produce an equal amount of the bacterial mass compared with the other kinds of bacteria. This characteristic appearing in the energy metabolism of the tested bacterium is a kind of "electron sink" phenomenon in which reducing equivalent produced in the electron metabolism is consumed on the outside of the cells. Therefore, since electrons generated during the oxidation process of organic matter are transferred to the electrode without doing work, it is possible to increase the efficiency of the electrode reaction, and this can effectively be utilized in the fuel cells using a microorganism, and further it is possible to increase organic catabolism efficiency in waste water.

A microbial catalyst which can be used in the present invention includes, without any limitation, any bacteria provided that it can produce an electric current using reducing equivalent from the fuel consumption in an anodic electrode reaction without any electron transfer mediators. As an example of such a microbial catalyst in the biofuel cell according to the present invention is preferably mesophilic or thermophilic bacteria which do not use in its growth reducing equivalent generated from the fermentation of various organic or inorganic matter present in waste water, but can consume it through an electrode. A more preferable strain is that which has a superior reducing power against ferric ion. The most preferable strain includes the bacterial strains of IR-1 and AJ-2, the detailed description of which are set forth in the examples of the present invention.

Fuel which can be used in the biofuel cell of the present invention, include conventional fuel such as an aliphatic compound, i.e., acetic acid, lactic acid, pyruvic acid, propionic acid, valeric acid, alcohols, and an aromatic compound, i.e., toluene, phenol, cresol, benzoic acid, benzyl alcohol, benzaldehyde [See, Lovely and Klug, 1990, Applied and Environmental Microbiology 56:1858–1864]. In addition, hydrogen or citric acid can be used. Waste water containing various organic matter and inorganic matter such as metals can also be used. In this aspect, the biofuel cell according to the present invention can be environmentally-friendly.

The detailed embodiments of the biofuel cell of the present invention will be further illustrated hereinbelow with reference to the attached drawings.

In the present invention, four kinds of biofuel cells were prepared and tested for their electric current productivity. Representative biofuel cells used are exemplified in FIGS. 1 to 4.

The cell having a type represented in FIG. 1 uses graphite rods as electrodes, and a cathode compartment and an anode compartment are separated by a sintered glass. Since this cell adopts the sintered glass and a graphite rod, the resistivity of the fuel cell is very high (above 50 k$\Omega$), and an effective surface area of the electrodes is low.

Figure 2:
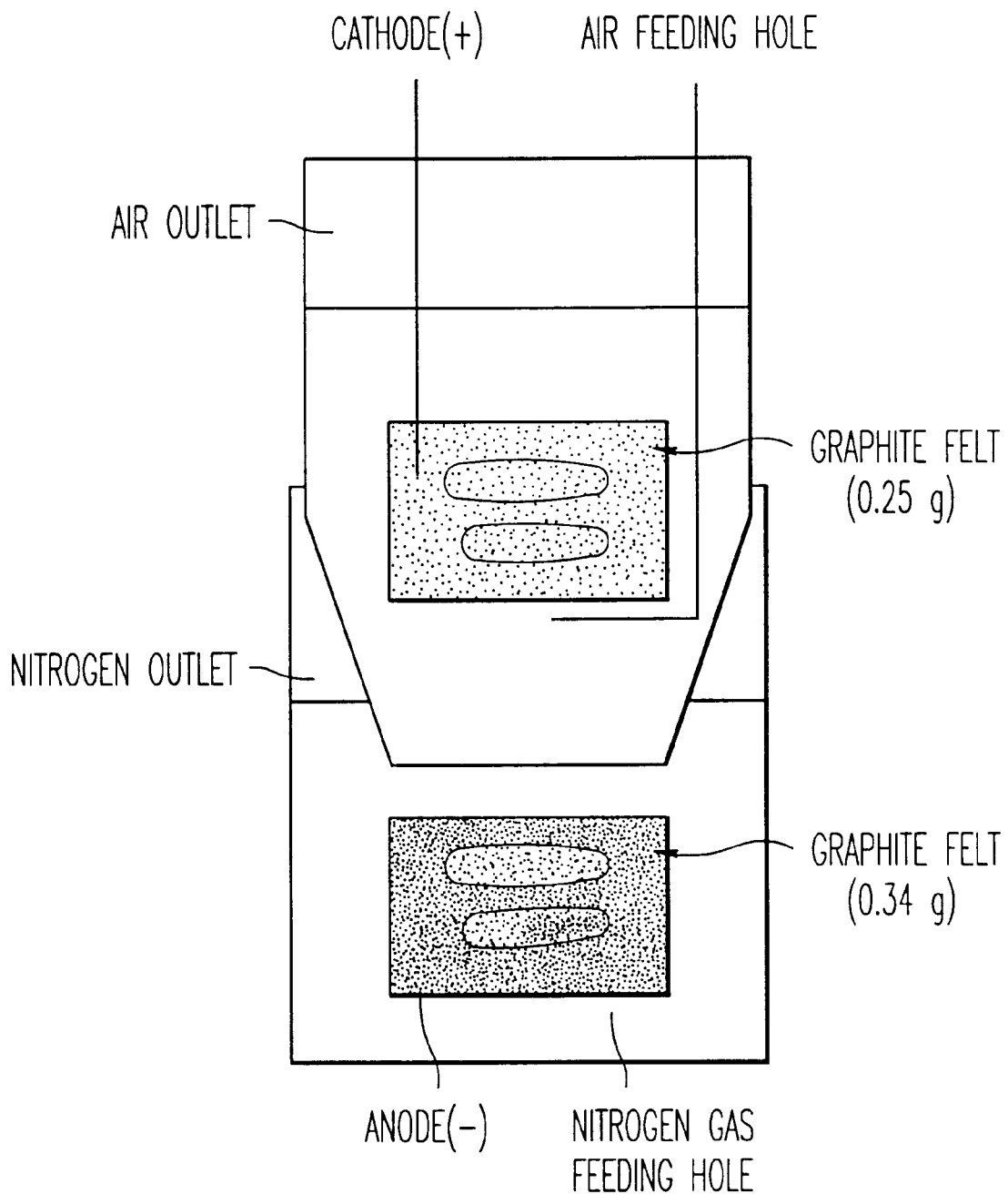
FIG. 2 is a schematic diagram of a fuel cell wherein a graphite nonwoven web ("graphite felt") is used as an electrode and the cathode compartment and the anode compartment are separated by a cation-exchange membrane.

Another kind of cell is as represented in FIG. 2. This cell employs graphite felt (surface area: 0.47 $m^2/g$) for the electrodes in order to maximize the surface area of the electrodes, and a cathode and an anode which are separated by a cation-exchange membrane in order to minimize the resistivity of fuel cell. The graphite felt used for the cathode and the anode weight 0.25 g and 0.34 g, respectively. This cell was improved from that of FIG. 1.

Figure 3:
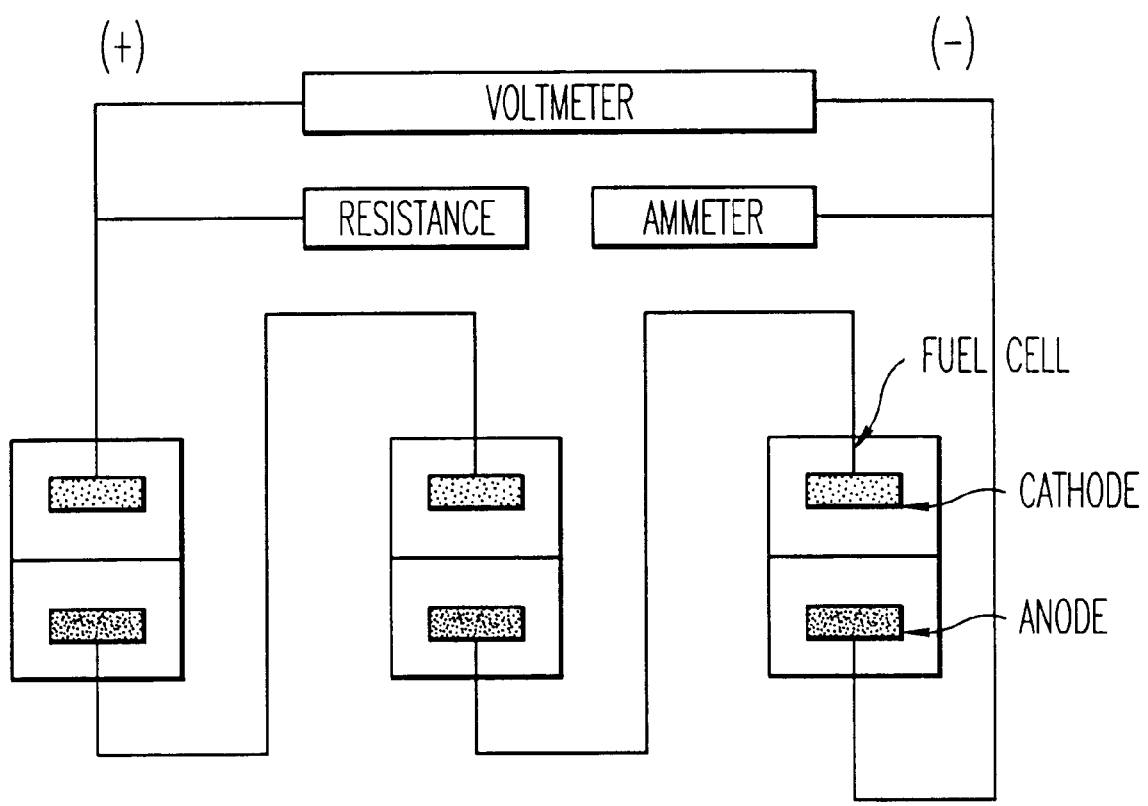
FIG. 3 represents a schematic diagram of the fuel cell of FIG. 2 connected-in-series.

FIG. 3 represents a fuel cell wherein three unit fuel cells in FIG. 2 are connected-in-series.

Figure 4:
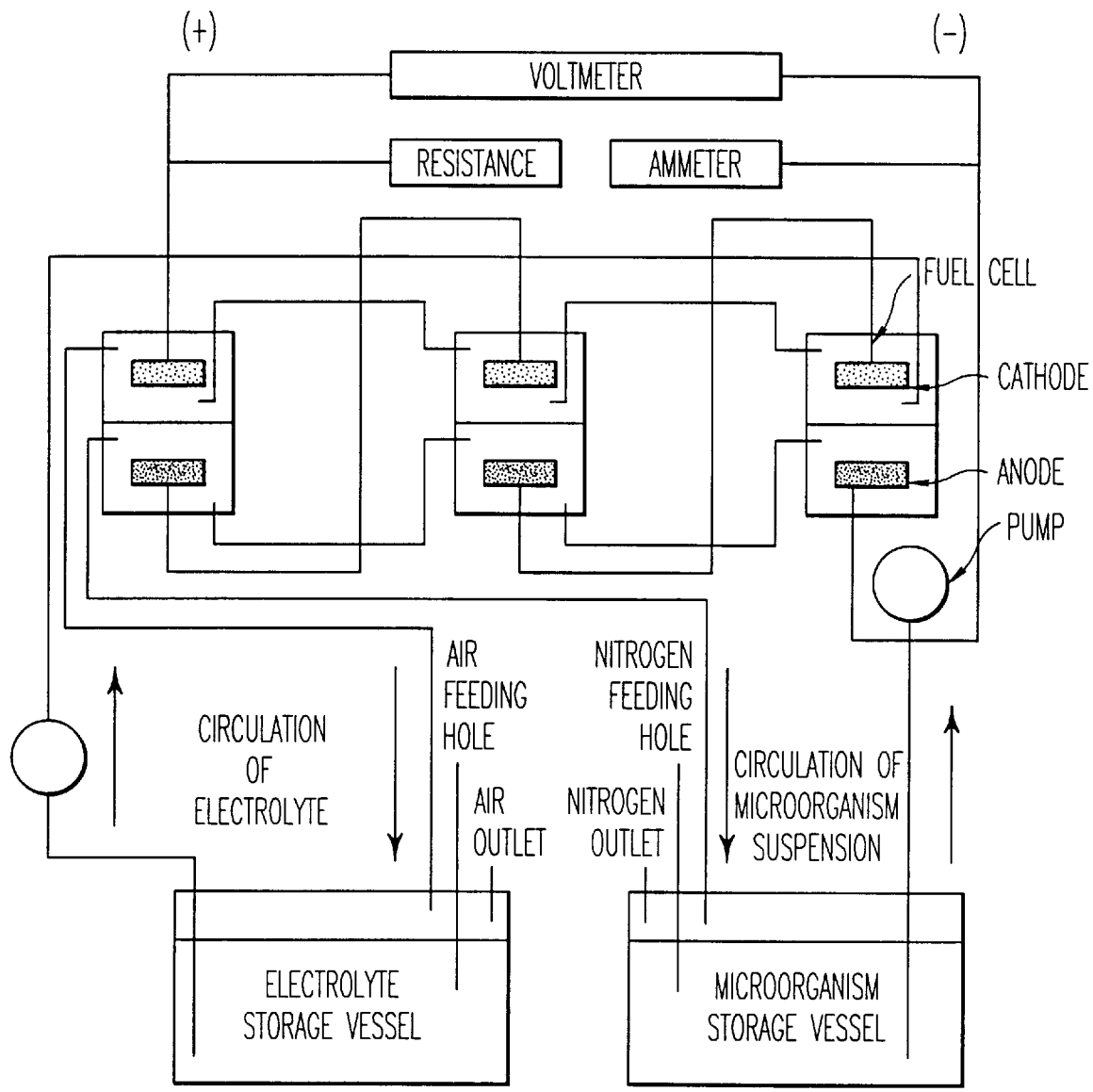
FIG. 4 represents a schematic diagram of the fuel cell of FIG. 3 connected-in-series to which a microorganism and a cathode electrolyte storage vessel are attached, and thus having a structure so that a microorganism suspension and an electrolyte are continuously circulated into the fuel cell.

FIG. 4 shows an another type of cell wherein a vessel for microbial cells and a cathode electrolyte storage vessel are attached to the fuel cell of FIG. 3, and thus the cell has a structure allowing a microorganism suspension and an electrolyte to be continuously circulated into the fuel cell.

The materials which can be used for the cathode and anode in the biofuel cell according to the present invention may be the conventional electrodes which are used in the art. For example, conventional graphite rods as shown in FIG. 1 can be used in the present invention. In addition, in order to reduce the resistivity of the fuel cell and increase effective surface area, graphite felt as shown in FIG. 2 may be used.

The cathode compartment and anode compartment of the biofuel cell according to the present invention may be separated by a sintered glass. However, it is preferable that the cathode and anode are separated by a conventional cation-exchange membrane to minimize the resistivity of the fuel cell.

As an electrolyte for the cathode, one may use a buffer solution in which a conventional electrolyte is dissolved. Preferably, 100 mM of phosphate buffer solution containing 100 mM of potassium chloride is used. When constituting a cell, an electrolyte for the cathode is kept in an oxygen-saturated state by continuously feeding air, and if necessary, a suitable amount of ferricyanide compound such as potassium ferricyanide, is added to the cathode to generate a higher potential difference.

As an electrolyte for the anode, an 100 mM of phosphate buffer solution may be used. The electrolyte for the anode is maintained in an anaerobic condition. The anaerobic condition for the anode can be, for example, made by feeding nitrogen gas, from which oxygen has been completely removed by passing the nitrogen through a gas purification oven for 30 minutes during the initial stage of fuel cell constitution to remove dissolved oxygen, and then closing electrode compartment. The buffer solution is adjusted to pH 7.0.

The electric current generated from the fuel cell is determined with an ammeter (Keithley Model 616 digital electrometer available from Keithley Instruments, Ohio, USA), and, if necessary, continuously determined with a recorder. The process of determining the electric current is within the knowledge of those skilled in the art.

In order to determine if the electrons generated from the energy metabolism of the tested bacteria can be consumed through an electron transfer enzyme located at the outer cell membrane, the electrochemical reactivity of bacteria and electrodes was determined by a cyclic voltammetric method [See, Kissinger, 1983, Journal of Chemical Education 60: 702–706]. The cyclic voltammetric method is widely utilized in research fields relating to the present invention, such as research relating to biofuel cells, biosensors, etc., since it provides various information related to the oxidation-reduction reaction of a specific material on an electrode surface. A basic electrochemical cell is used in the cyclic voltammetric method. The changes generated from the variation of the scanned voltage between the bacteria and electrodes are determined with a potentiostat (Model: BAS CV-27, manufacturer: Bioanalytical Systems, Inc. Indiana, USA) according to the instructions recommended by the manufacturer.

The biofuel cell according to the present invention can directly consume the electron generated from the energy metabolism of a microorganism, without it being used in bacterial reproduction, by using electrodes as an electron acceptor. Therefore, if waste water is utilized as a fuel (substrate) in the metal salt reducing bacteria biofuel cell according to the present invention, the amounts of sludge and methane production will be greatly reduced and the efficiency of catabolizing organic matter will be increased.

DESCRIPTION OF THE PREFERRED EMBODIMENTS

The present invention will be illustrated in greater detail by way of the following examples. The examples are presented for illustrative purpose only and should not be construed as limiting the invention, which is properly delineated in the claims.

EXAMPLE 1

In order to isolate a metal salt reducing bacterium which can be used in the present invention, identify its taxonomic position, physiological characteristics and properties beneficial to the biofuel cell, the following experiments were conducted.

A number of bacterial samples were collected from various locations including a rice paddy field, the bottom soil of Jungrangchon (a branch of the Han River, Seoul) and an anaerobic septic tank of a sewage treatment works, etc. Among them, bacteria were selected which utilize as an electron donor lactate and as an electron acceptor ferric oxide. The detailed isolation method is as follows. The samples from soil, deposits and sludge were suspended in physiological saline, and diluted by $10^6$ to $10^7$. Each of 30 ml of diluted sample was streaked onto a solid plate containing a carbonate buffer basal medium ("hereinafter referred to "CBBM") supplemented with 30 mM of lactate and 10 g/l of ferric ion, and then incubated in an absolute anaerobic condition for 4 to 5 days at 25° C. The CCBM contained 0.9 g/l of NaCl, 0.25 g/l of $MgSO_4$, 0.1 g/l of $CaCl_2$, 1 g/l of yeast extract, 10 mM of phosphate, 10 ml/l of an inorganic trace element solution (which contained 1.5 g of nitrilotriacetate, 0.1 g of $FeSO_4.7H_2O$, 0.1 g of $MnCl_2.4H_2O$, 0.17 g of $CoCl_2.6H_2O$, 0.1 g of $CaCl_2.2H_2O$, 0.1 g of $ZnCl_2$, 0.02 g of $CuCl_2.2H_2O$, 0.1 g of $H_3BO_3$, 0.01 g of Na-molybdate, 0.017 g of $Na_2SeO_3$, 0.026 g of $NiSO_4.6H_2O$, 1 g of NaCl, and 1000 ml of distilled water). Each bacterial colony was cultured under anaerobic condition in a carbonate buffer liquid basal medium supplemented with 30 mM of lactate and 10 g/l of ferric and the ferrous ion produced was quantified at an one day interval. Ferrous ion was quantified according to a ferrozine color developing method [See, DooHyun PARK, et al., (1996) Korean Journal of Industrial Microbiology, Vol. 24:364–370]. The culture tubes in which ferrous ion was not produced were eliminated and the culture tubes wherein the amount of the ferrous ion reached 2 mM were selected, checked for any contamination, and stored. The bacteria was stored as a stab culture or a slant culture in a commonly used agar medium in a cold room at 4° C. Two colonies, each having a blackish-brown color and a white color, respectively were found to have superior ferric-ion reducing ability, and were named IR-1 and AJ-2, respectively. Among them, IR-1 is a gram-negative bacterium which grows on LB agar medium, has a rod shape, is short in length, does not have spores, and is immotile. In view of this, it is believed to be a species of the Shewanella genera. The strain IR-1 obtained its energy for growth by oxidizing lactate into acetate and was optimally grown at a temperature of 25° C. Meanwhile, the strain AJ-2 grows on LB agar medium and is a gram-negative bacterium which has a spherical shape and is short in length. In view of this, it is believed to be a strain of *Pseudomonas pseudomallei*. The strains IR-1 and AJ-2 were deposited on Jul. 23, 1996 with the KRIBB (Korea Research Institute of Bioscience and Biotechnology, 52 Oun-dong, Yusong-ku, Taejeon 305–333, Republic of Korea) which is an international depository recognized under the Budapest Treaty. The IR-1 and AJ-2 strains received the deposit number of KCTC 0371 BP and KCTC 0370 BP, respectively. These deposits were made in accordance with all of the requirements of the Budapest Treaty.

In order to determine the growth and metabolic characteristics of IR-1, its growth rate as a function of electron donor and acceptor was compared as follows. CCBM supplemented with 30 mM of lactate, pyruvate, or hydrogenacetate was used as a substrate, and nitrate or ferric ion was utilized as an electron acceptor. The growth according to the electron donor was compared and the results are set forth in Table 1 below.

TABLE 1

The effect of electron donor and electron acceptor on growth of IR-1

| Electron donor | Electron acceptor | Carbon source | Growth yield* | Amount of ferric iron reduced (mM) |
|---|---|---|---|---|
| lactate | — | | 0 | |
| pyruvate | — | | 3.4 | |
| hydrogen | ferric ion | acetate/carbon dioxide | 0 | 1.1 |
| lactate | ferric ion | | 3.3 | 3.5 |
| pyruvate | ferric ion | | 3.9 | 3.5 |
| hydrogen | nitrate | acetate/carbon dioxide | 9.7** | |
| lactate | nitrate | | 6.9 | |
| pyruvate | nitrate | | 5 7 | |

*: amount of bacteria increased per mole of substrate
**: calculated as the amount of acetic acid consumption vs the amount of bacteria in grams As can be seen from Table 1 above, the strain IR-1 oxidized pyruvic acid into acetic acid to produce ATP which is then used as an energy source for its growth. Lactic acid within the bacterial mass is first oxidized into pyruvic acid, and then subjected to the same metabolic pathway as the above. When pyruvic acid was used as a fuel (substrate), the bacterial mass yield was similar to the case when ferric ion was additionally used. In the experiment using lactic acid and ferric ion, a similar result was shown. These facts shows that the growth of the tested bacterium depends absolutely on ATP synthesis of a pyruvate metabolism, and the energy generated while the ferric ion was reduced is not conserved for the growth of the microorganism. These results means that when IR-1 uses ferric ion as an electron sink, it could not produce ATP through anaerobic respiration metabolism, thus it should use for its growth the energy produced in fermentation metabolism.

In the meantime, when hydrogen was used as an electron donor and ferric ion was used as an electron acceptor, the test bacteria did not grow at all. This is understood to indicate that the electrons generated upon oxidation of hydrogen also cannot be used in the energy production through the respiratory metabolism. On the other hand, the tested bacterium demonstrated a high growth in the medium containing nitrate as an electron acceptor.

Figure 5:
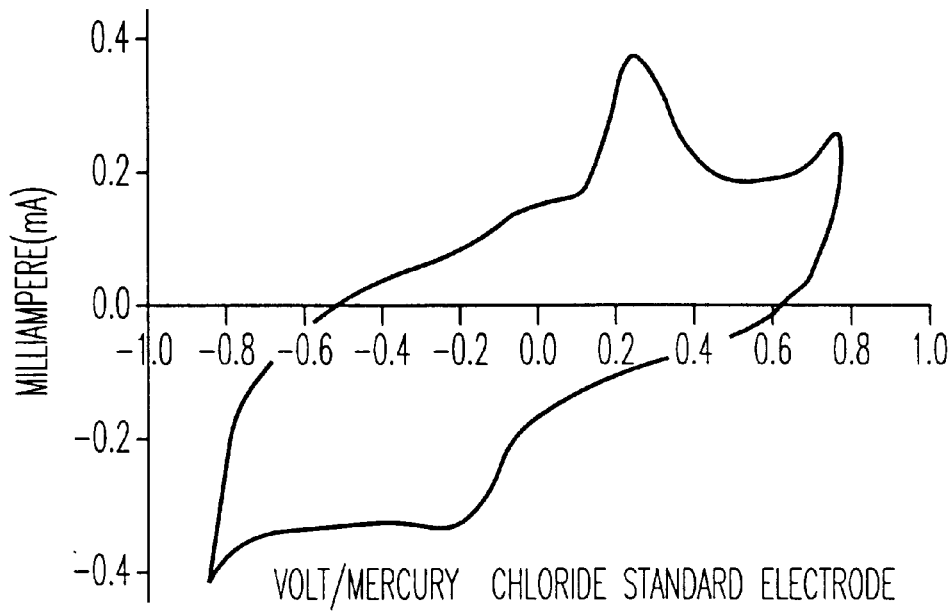
FIG. 5 represents a cyclic voltammogram by an electrode reaction of metal salt reducing bacteria.

The electrochemical reactivity between the bacterial mass and electrodes was determined by the cyclic voltammetric method. A basic electrochemical cell was used in this method. The changes of the electric current generated between the bacterial cells and electrodes according to the changes of the scanned voltage was determined with a potentiostat (Model: BAS CV-27, manufacturer: Bioanalytical Systems, Inc. Indiana, USA) according to the instruction recommended by the manufacturer. Prior to the determination by the cyclic voltammetric method, the bacterial cells to be tested was cultivated under anaerobic conditions with CBBM supplemented with 30 mM of pyruvate for 3 days at 25° C. The bacterial mass was harvested by centrifugation at 300× g for 25 minutes at 4° C. The collected pellets were then diluted to the final bacterial concentration of 0.7g/l. The reaction results of the bacterial cells and the electrodes are presented in FIG. 5 in terms of the cyclic voltammetric changes. As can be seen from FIG. 5, the tested bacteria reacted with the electrodes and showed a similar type of reaction to cytochrome. This is an important property, since the test bacteria used in the present invention can directly react with the electrodes to exchange electrons, thus can exclude the electron transfer mediator in the biofuel cell.

EXAMPLE 2

In this example, the bacterial strain IR-1 was used to test the electric current productivity of the biofuel cells as set forth in FIG. 2.

The electrodes of the cathode and the anode were made of a graphite felt having an effective surface area of 0.1175 $m^2$ and 0.1598 $m^2$, respectively. As an electrolyte for the cathode, 100 mM of phosphate buffer solution containing 100 mM of potassium chloride was used. As an electrolyte for the anode, 100 mM of phosphate buffer solution containing 100 mM of potassium chloride was used. The cathode and anode was separated by a sintered glass. The electrolyte for the cathode was kept aerobic state by feeding continuously air. The electrolyte for the anode was maintained in an anaerobic condition. The anaerobic condition for the anode was made by feeding nitrogen gas from which oxygen was completely removed by passing the nitrogen through a gas purification oven for 30 minutes at the initial stage of fuel cell constitution to remove dissolved oxygen, and then closing the electrode compartment. The buffer solutions were adjusted to pH 7.0. The resistivity of the fuel cell tested was 52 kΩ and the resistance of ammeter set at 10 Ω.

Figure 6:
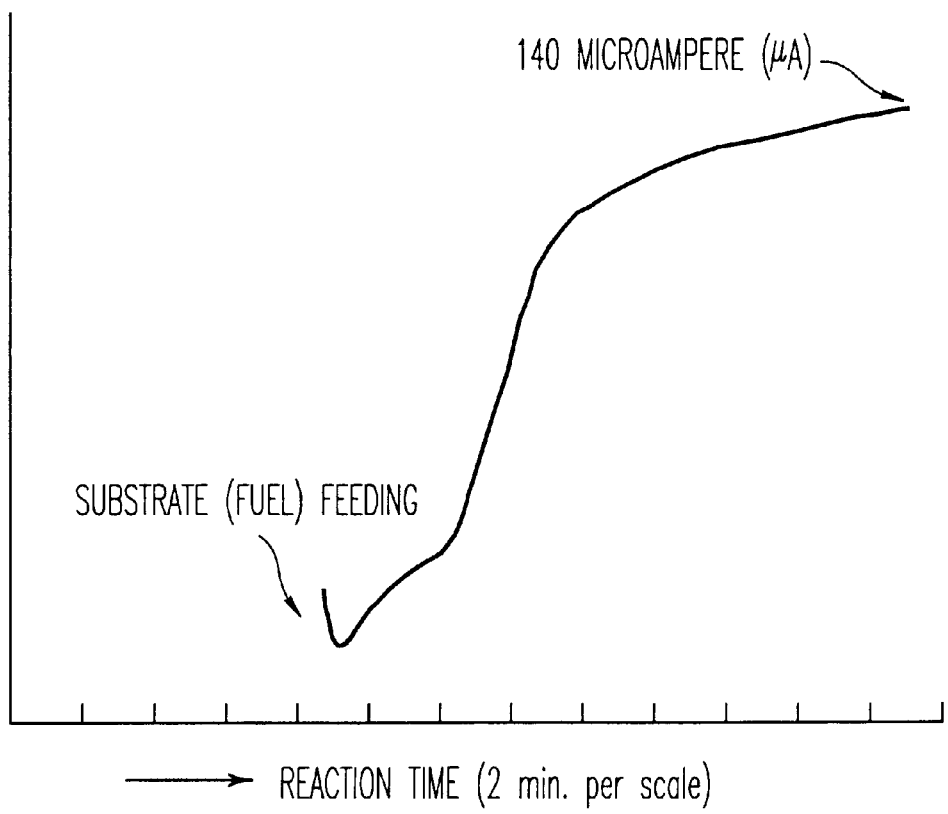
FIG. 6 is a graph representing the amount of electric current generated from a biofuel cell according to the present invention using lactate as a fuel.

The anode compartment of the fuel cell thus prepared was filled with 50 ml of the bacterial strain IR-1 and maintained under anaerobic conditions. The bacterial strain to be tested was cultivated under anaerobic conditions with CBBM supplemented with 30 mM lactate for 48 hrs at 25° C. The bacterial mass was harvested by centrifugation at 3000× g for 25 minutes at 4° C. The collected pellets were then washed twice with 100 ml of phosphate buffer and suspended in 100 ml of phosphate buffer containing 100 mM of potassium chloride in order to be used in the test. 30 mM of lactate as a fuel was added to the thus prepared fuel cell and then the amounts of the electric current generated immediately after the addition were determined with an ammeter connected to a recorder. As can be seen from the FIG. 6, it was observed that the maximum electric current generated was 140 μA. By this experiment, it was confirmed that the electrons generated when a substrate is oxidized in the energy metabolism of the test bacteria are directly transferred to the electrodes to generate electric current by using organic matter as a fuel.

EXAMPLE 3

In this Example, the bacterial strain IR-1 as a microbial catalyst and hydrogen as a fuel were used to test the electric current productivity of the biofuel cells as set forth in FIG. 1. The other physiological conditions of the biofuel cell were the same as in Example 2.

Graphite rods having effective surface area of 6.78 $cm^2$ (8 cm in length, 25 mm in diameter) were used for the electrodes of the cathode and the anode. The resistivity of the fuel cell tested was 55 kΩ and the resistance of ammeter was set at 10 Ω.

Figure 7:
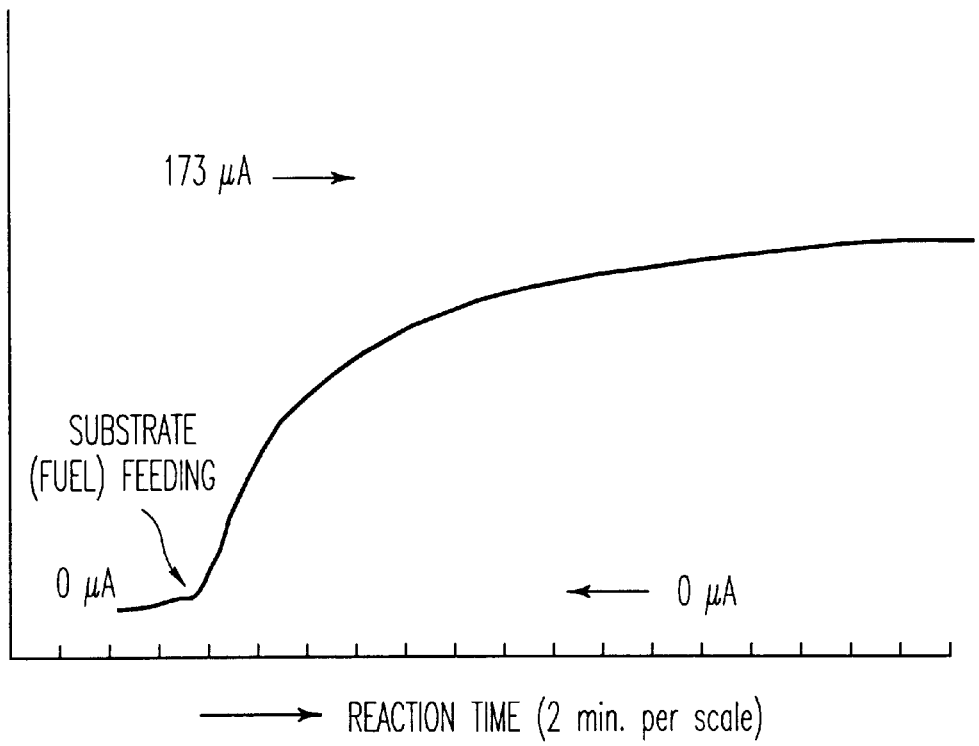
FIG. 7 is a graph representing the amount of electric current generated from a biofuel cell according to the present invention using hydrogen as a fuel.

The anode compartment of the fuel cell thus prepared was filled with 50 ml (1.4 g/l) of the bacterial strain IR-1 and maintained under anaerobic conditions. The bacterial strain to be tested was cultivated under anaerobic conditions with CBBM supplemented with 30 mM of lactate for 48 hrs at 25° C. The bacterial mass was harvested by centrifugation at 3000× g for 25 minutes at 4° C. The collected pellets were then washed twice with 50 ml of phosphate buffer and suspended in 100 ml of phosphate buffer containing 100 mM of potassium chloride in order to be used in the test. Hydrogen from which oxygen was completely removed by passing the hydrogen through a gas purification oven for 30 minutes was fed into the thus prepared fuel cell. The amounts of the electric current generated from this time were determined with an ammeter connected to a recorder. As can be seen from the FIG. 7, it was observed that the maximum electric current generated was 173 μA.

EXAMPLE 4

In this Example, the bacterial strain IR-1 as a microbial catalyst and pyruvate as a fuel were used to test the electric current productivity by the biofuel cells as set forth in FIG. 1. The other physiological conditions of the biofuel cell were the same as in Example 2.

Graphite rods having effective surface area of 6.78 $cm^2$ (8 cm in length, 25 mm in diameter) were used for the electrodes of the cathode and anode. The resistivity of the fuel cell tested was 55 kΩ and the resistance of ammeter was set at 10 Ω.

Figure 8:
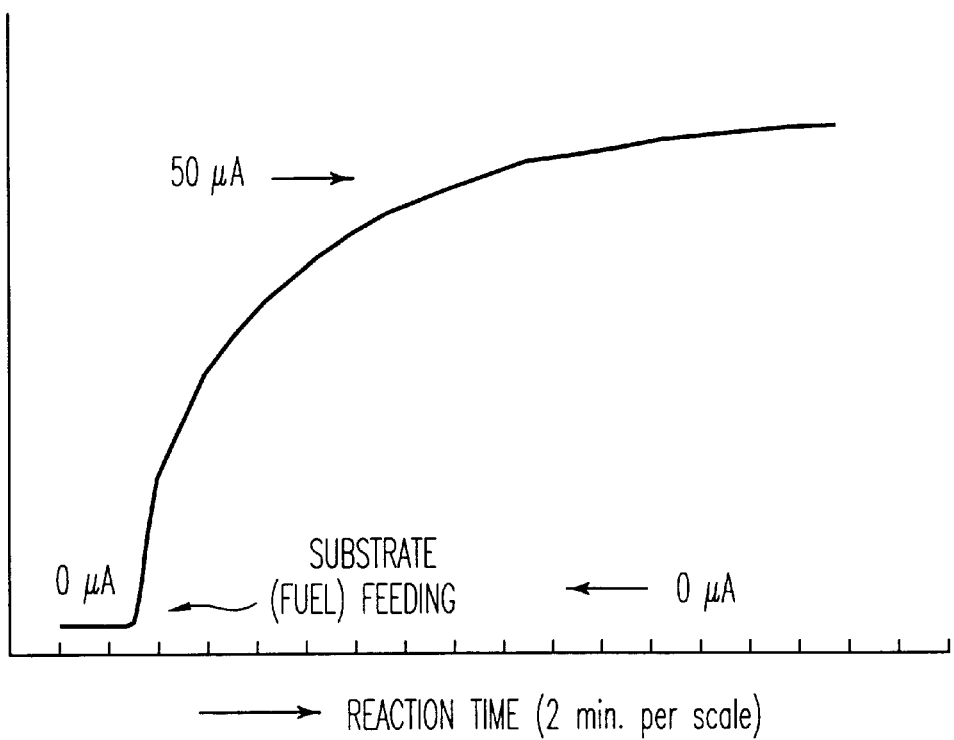
FIG. 8 is a graph representing the amount of electric current generated from a biofuel cell according to the present invention using pyruvate as a fuel.

The anode compartment of the fuel cell thus prepared was filled with 50 ml (0.2 g/l) of the strain IR-1 and maintained under anaerobic conditions. The bacterial strain to be tested was cultivated under anaerobic conditions with CBBM supplemented with 30 mM of lactate for 48 hrs at 25° C. The bacterial mass was harvested by centrifugation at 3000× g for 25 minutes at 4° C. The collected pellets were then washed twice with 50 ml of phosphate buffer and suspended in 100 ml of phosphate buffer containing 100 mM of potassium chloride in order to be used in the test. Pyruvate was fed into the thus prepared fuel cell, while the amounts of the electric current generated from this time were determined with a recorder. As can be seen from the FIG. 8, it was observed that the maximum electric current generated was 50 μA.

EXAMPLE 5

In this Example, the bacterial strain AJ-2 as a microbial catalyst and citrate as a fuel were used to test the electric current productivity of the biofuel cells as set forth in FIG. 1. The other physiological conditions of the biofuel cell were the same as in Example 2.

Graphite rods having effective surface area of 6.78 $cm^2$ (8 cm in length, 25 mm in diameter) were used for the electrodes of the cathode and the anode. The resistivity of the fuel cell tested was 55 kΩ and the resistance of ammeter was set at 10 Ω.

Figure 9:
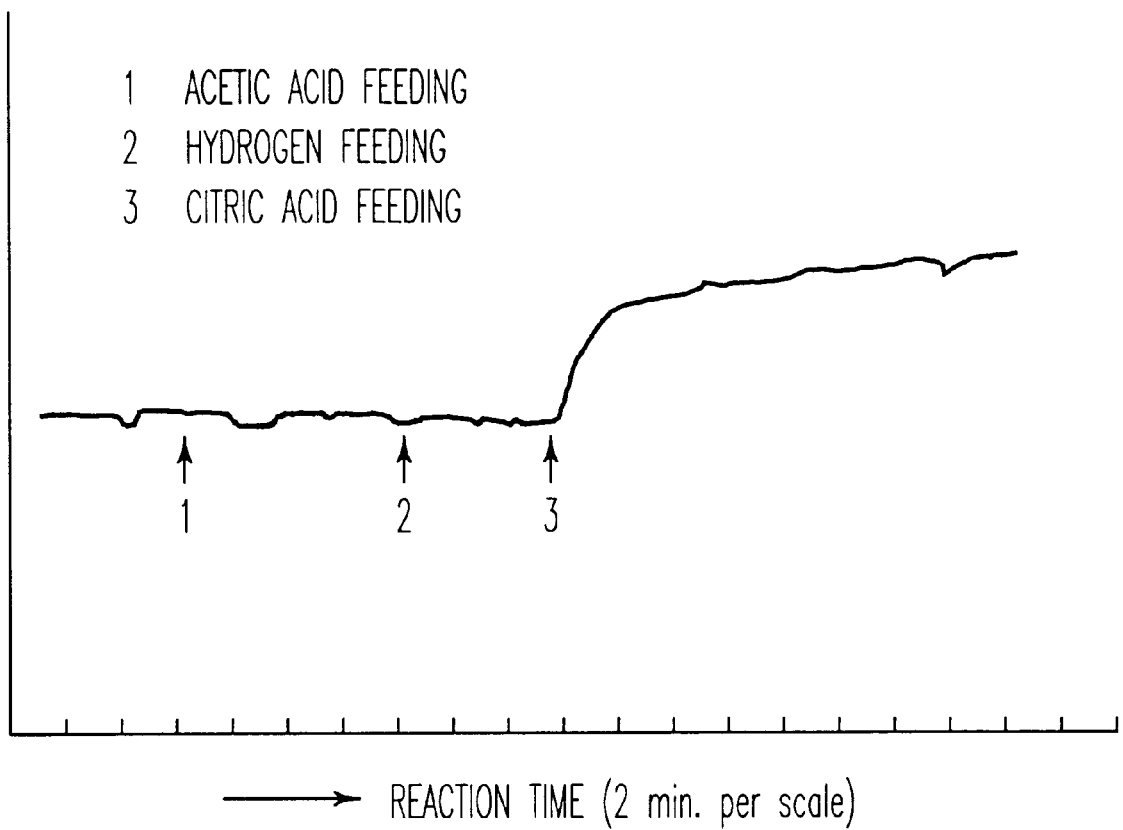
FIG. 9 is a graph representing the results of electric current productivity generated from bacteria utilizing citrate as a substrate.

The anode compartment of the fuel cell thus prepared was filled with 50 ml (2 g/l concentration) of the bacterial strain AJ-2 and maintained under anaerobic conditions. The bacterial strain to be tested was cultivated under anaerobic conditions with CBBM supplemented with 30 mM of citrate for 48 hrs at 25° C. The bacterial mass was harvested by centrifugation at 3000× g for 25 minutes at 4° C. The collected pellets were then washed twice with 50 ml of phosphate buffer and suspended in 100 ml of phosphate buffer containing 100 mM of potassium chloride in order to be used in the test. Acetate and hydrogen in which oxygen is completely removed by passing the nitrogen gas through a gas purification oven for 30 minutes, and citrate were fed into the thus prepared fuel cell, while the amount of the electric current generated from the addition were determined with a recorder. As can be seen from the FIG. 9, there was no change in the electric current when acetate or hydrogen was added, but immediately after the addition of citrate, electric current was generated. This implies that the reducing power generated when the strain AJ-2 oxidizes citrate can be directly consumed through the electrodes.

EXAMPLE 6

In this Example, the bacterial strain IR-1 as a microbial catalyst and lactate as a fuel were used to test the electric current productivity by the biofuel cells as set forth in FIG. 2. The other physiological conditions of the biofuel cell were the same as in Example 2.

The electrodes of the cathode and the anode were made of a graphite felt having an effective surface area of 846 $cm^2$ and 1,175 $cm^2$, respectively. The resistivity of the fuel cell tested was 15 kΩ and the resistance of the ammeter was set at 10 Ω.

Figure 10:
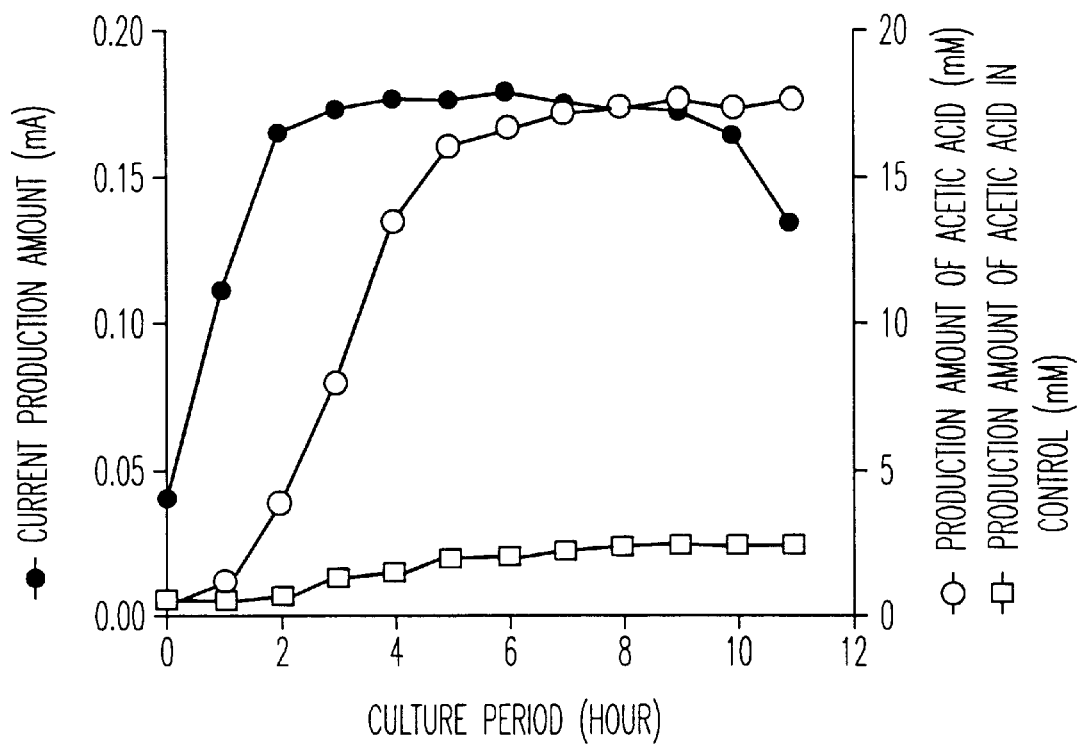
FIG. 10 is a graph representing the amount of electric current produced in biofuel cell and the substrate conversion rate.

The anode compartment of the fuel cell thus prepared was filled with 0.7 g/l of test bacterial suspension and maintained under anaerobic conditions, while the amounts of the electric current generated from this time were continuously determined with an ammeter connected to a recorder. As can be seen from FIG. 10, the maximum electric current was observed to be 0.18 mA. About 36% of lactate added to the fuel cell was oxidized. About 5% of lactate was oxidized into acetate in a control experiment where the cathode was not connected to the anode. By this experiment, it was confirmed that the electrons generated from the energy metabolism of the tested bacterium are directly consumed through the electrodes in place of the electron acceptor to generate electric current.

EXAMPLE 7

Figure 11:
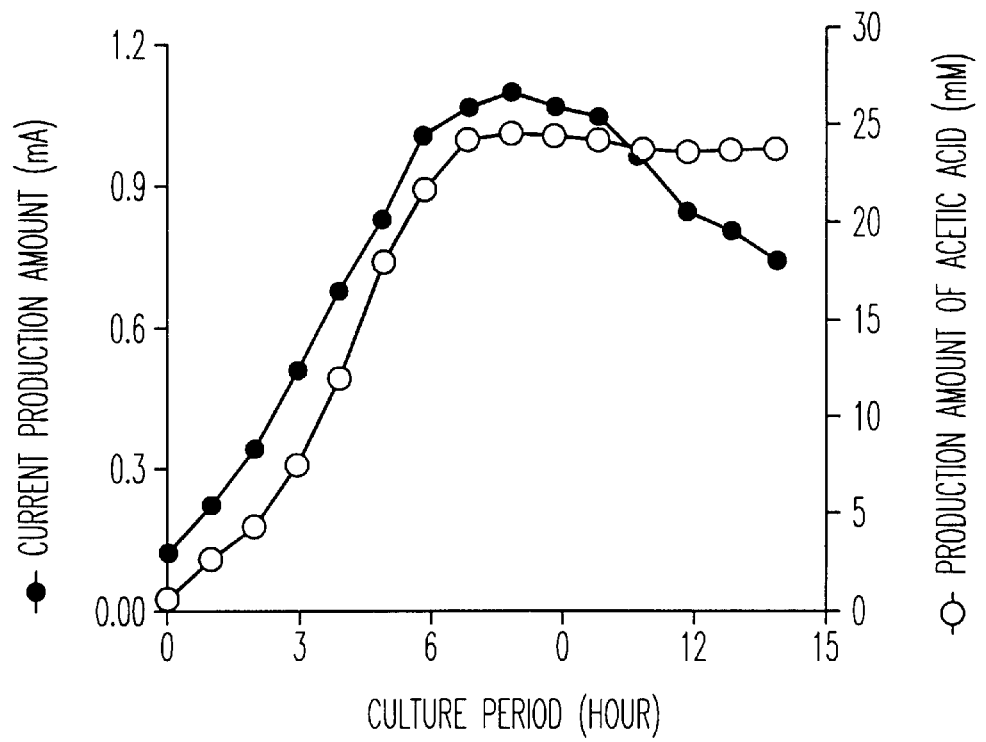
FIG. 11 is a graph representing the amount of electric current produced and metabolic products in an experiment conducted in order to improve the efficiency of biofuel cell.

In this example, experiments were carried out in the same manner to the Example 6, except that the amount of the bacterial mass and the area of the anode was varied. The electrodes for the anode was increased to 4,700 $cm^2$ and the amount of the bacterial mass to 1.5 times. As can be seen from the FIG. 11, there was observed 1.1 mA of the maximum electric current. About 60% of lactate added into the fuel cell was oxidized into acetate. From this experiment, it was confirmed that the effective area of the electrode for an anode serves an important factor to increase the efficacy of the biofuel cell.

EXAMPLE 8

Until Example 7, the electrolyte for the anode was oxygen present in air while electrons running the outside of circuit of the biofuel cell reduces oxygen at the surface of the cathode and a hydrogen ion passed the ion exchange membrane is bound to the reduced oxygen to produce water. At this time, since oxygen in a gas state should be dissolved into the electrolyte to receive electrons at an electrode, the potential difference between the cathode and the anode can be changed according to the reactivity of oxygen provided to the surface of electrode. Therefore, it was tested whether it is possible to constitute a biofuel cell from which the potential difference between the two electrodes are increased and a relatively high flow of electric current is obtained using liquid electrolyte which can increase reactivity of dissolved oxygen.

In this example, the experiments were carried out in the same manner as in Example 7, except that a solution in which 100 mM of potassium ferricynide $K_3Fe(CN)_6$ is dissolved in 100 mM of phosphate buffer solution containing 100 mM of potassium chloride was added to the cathode compartment of the cell.

Figure 12:
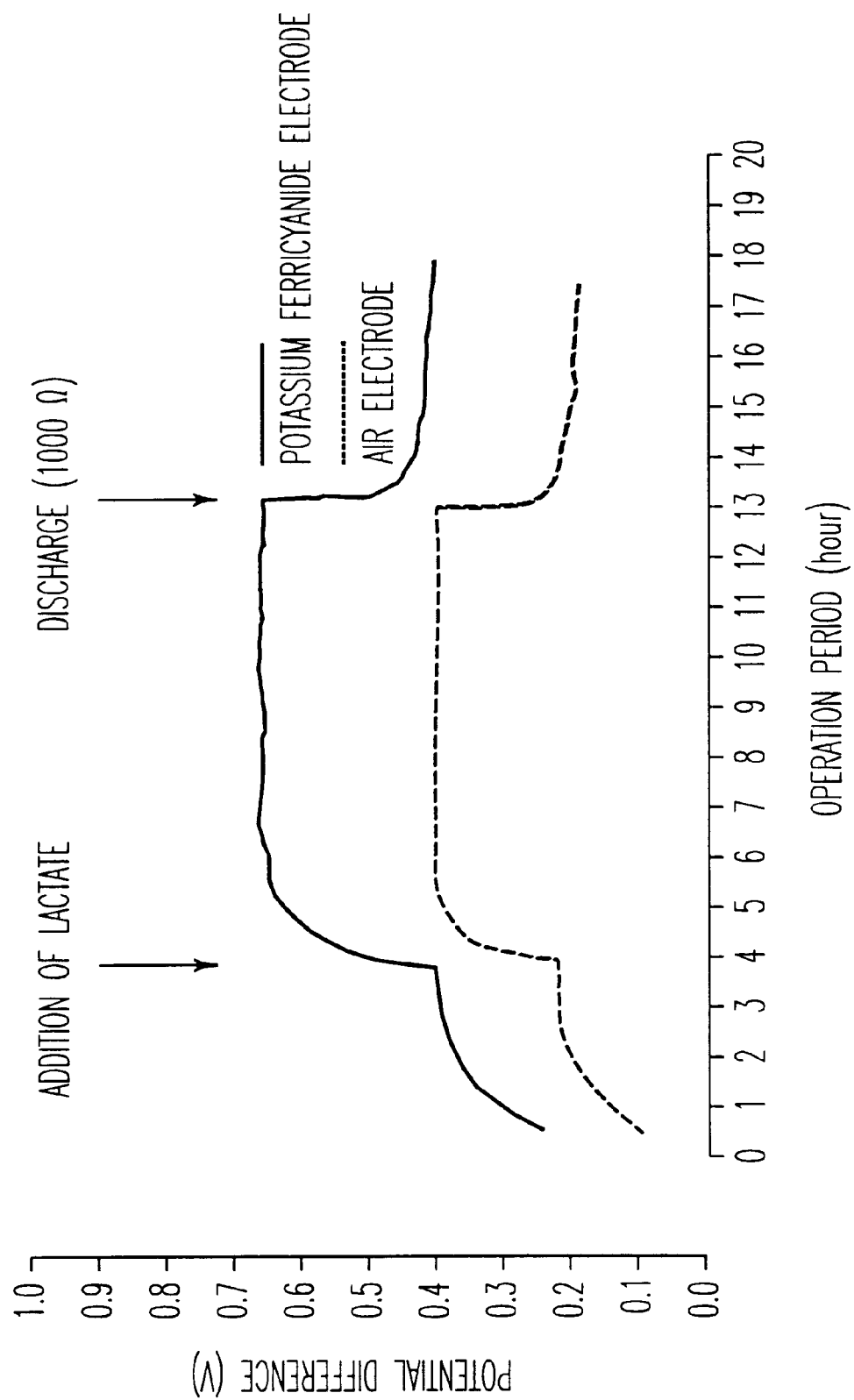
FIG. 12 is a graph representing a comparison between the characteristics of voltage and electric current generated when potassium ferricynide is added to the cathode of a biofuel cell and when air only is added.

As can be seen from FIG. 12, the potential difference generated between the electrodes of the fuel cell was increased to 0.68 volts when the outside circuit was opened. This result shows that, by changing the cathodic electrode, there was an increase of about 0.2 volts or more compared with the case of where only air was used in the cathode. This potential difference was maintained over 9 hours. When 1000 Ω of resistance was loaded on the cell and then discharged, the potential difference generated between the electrodes was revealed to be 0.4 volts. In accordance with the tendency of a common primary cell (a dry cell) or a secondary cell (a charging cell), the electric current gradually decreased as time elapsed.

From the above results, it is observed that when potassium ferricyanide was used in the cathode compartment, the cell represented a high potential difference and a large amount of electric current by consuming electrons more rapidly. At this time, it is believed that ferrocyanide, $Fe^{2+}(CN)_6^{4-}$ wherein ferricyanide $Fe^{3+}(CN)_6^{3-}$ has been reduced is oxidized by dissolved oxygen, and again oxidized to the form of ferricyanide and then reduced at the surface of the electrodes. The cathode having the said compound was confirmed to increase the oxidizing action of the cathode, thus improving the efficiency of the biofuel cell.

EXAMPLE 9

In this example, the changes in electrical characteristics were determined by connecting-in-series three biofuel cells and using potassium ferricyanide as an electrolyte for the cathode compartment as described in FIG. 4. The other conditions were carried out in the same manner as in Example 8.

Figure 13:
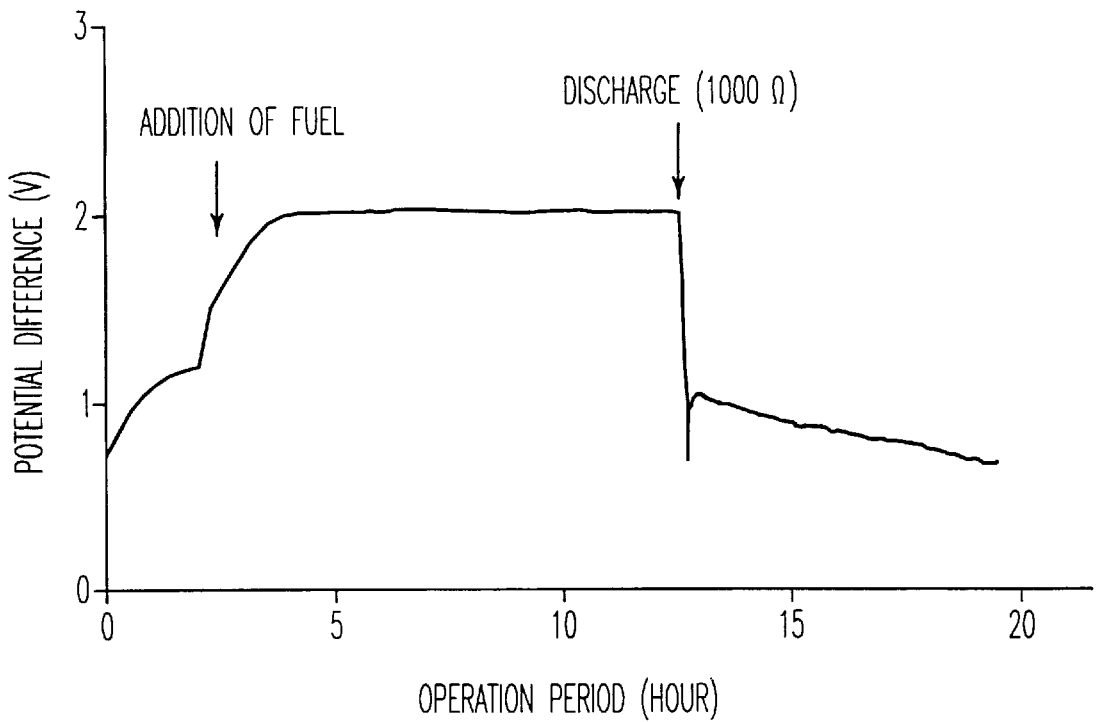
FIG. 13 is a graph representing the characteristics of voltage and electric current generated by three biofuel cells connected-in-series.

As can be seen from the FIG. 13, the potential generated between both the electrodes of the fuel cell was increased to 2.1 volts when the outside circuit was opened. This results show that this potential difference equals that of the sum of the unit biofuel cells (three in the present invention) in an opened circuit, about 2.0 volts of potential difference was constantly maintained before loading resistant to the outside of circuit and discharged. When 1000 Ω of resistance was loaded to the system and then discharged the outside of the circuit, the initial electric current was decreased to 1.1 mA. The power was revealed as 1.1 milliwatts. The power gradually decreased as time elapsed.

From this experiment, it was confirmed that if each of the unit biofuel cell is connected-in-series it is possible to increase the voltage of an open circuit and that of the connected circuit.

EXAMPLE 10

In this example, the changes in the electrical characteristics were determined by circulating a large amount of fuel and oxidative material through a microorganism storage and an oxidative material storage vessel of a biofuel cell having the same working capacity as in FIG. 4. The capacity of each of the outside storage vessels was 250 ml and circulation through the vessels was maintained using a pump at a flow rate of 5 ml per minute. The microorganism in the vessel and electrolyte for a cathode were continuously circulated. The other experimental conditions were the same as in Example 9.

Figure 14:
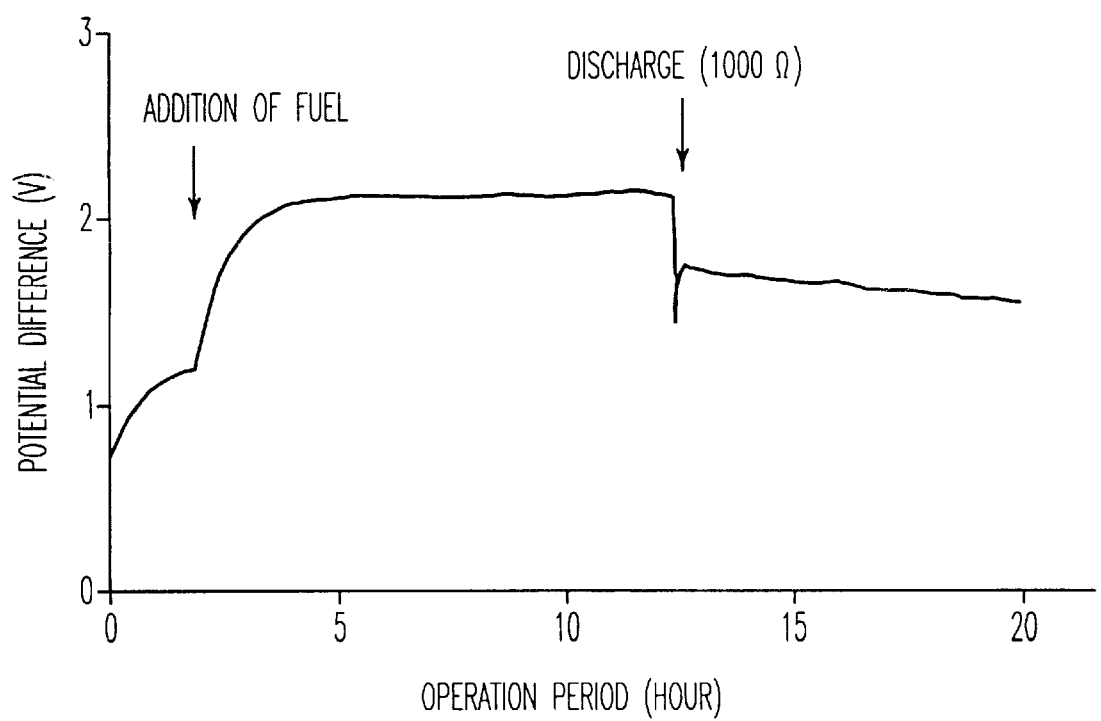
FIG. 14 is a graph representing the characteristics of voltage and electric current generated when outside storage vessels of a microorganism suspension and a cathode electrolyte are attached to the outside of the three biofuel cells connected-in-series, and circulated with a pump.

As can be seen from FIG. 14, a potential of 2.2 volts were generated when a microorganism and the electrolyte for the cathode were continuously circulated. This reveals that an increase of about 0.2 volts compared with the case when fuel cells are connected-in-series without an outside storage vessel in an opened circuit. After 10 hours, when 1000 Ω of resistance was loaded to the cell and then discharged, the voltage was decreased to 1.8 volts. The running electric current and the produced power were 1.8 milliampere and 3.2 milliwatts, respectively. At this time, the power showed stable values over 6 hours. Therefore, it was confirmed that the circulation of the microorganism and electrolyte for the cathode through outside storage vessels can increase the working efficiency of the fuel cell.

What is claimed is:

1. A mediator-less biofuel cell, comprising:

a cathode, an anode, a conductive media thereof, an ion exchange membrane interposed between said cathode and said anode, and a microbial catalyst around said anode, wherein said microbial catalyst is a metal salt reducing bacteria.

2. The mediator-less biofuel cell according to claim 1, wherein the metal salt reducing bacteria is *Shewanella putrefaciens*.

3. The mediator-less biofuel cell according to claim 2, wherein the metal salt reducing bacteria is Shewanella putrefaciensIR-1 (KCTC 0371 BP).

4. The mediator-less biofuel cell according to claim 1, wherein the metal salt reducing bacteria is *Pseudomonas pseudomallei*.

5. The mediator-less biofuel cell according to claim 4, wherein the metal salt reducing bacteria is *Pseudomonas pseudomallei* AJ-2 (KCTC 0370 BP).

* * * * *